US010088303B2

(12) United States Patent
Ohtomo et al.

(10) Patent No.: US 10,088,303 B2
(45) Date of Patent: Oct. 2, 2018

(54) DISPLACEMENT MEASURING METHOD AND DISPLACEMENT MEASURING DEVICE

(71) Applicant: Kabushiki Kaisha TOPCON, Tokyo-to (JP)

(72) Inventors: Fumio Ohtomo, Saitama (JP); Kaoru Kumagai, Tokyo-to (JP); Masayuki Momiuchi, Tokyo-to (JP); Kazuki Osaragi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 326 days.

(21) Appl. No.: 14/861,454

(22) Filed: Sep. 22, 2015

(65) Prior Publication Data

US 2016/0109228 A1    Apr. 21, 2016

(30) Foreign Application Priority Data

Oct. 16, 2014  (JP) ................................ 2014-211844

(51) Int. Cl.
*G01B 11/25*  (2006.01)
*G01D 5/347*  (2006.01)
(Continued)

(52) U.S. Cl.
CPC .......... *G01B 11/254* (2013.01); *G01B 11/002* (2013.01); *G01B 11/26* (2013.01);
(Continued)

(58) Field of Classification Search
None
See application file for complete search history.

(56) References Cited

U.S. PATENT DOCUMENTS

2009/0231574 A1   9/2009 Vogel et al.
2012/0154577 A1*  6/2012 Yoshikawa .............. H04N 7/18
                                              348/140
(Continued)

FOREIGN PATENT DOCUMENTS

DE      112008003711 T5    11/2010
EP           2607845 A2     6/2013
(Continued)

OTHER PUBLICATIONS

European communication dated Mar. 22, 2016 in corresponding European patent application No. 15186810.6.

*Primary Examiner* — Janese Duley
(74) *Attorney, Agent, or Firm* — Nields, Lemack & Frame, LLC (57) ABSTRACT

A displacement measuring device, comprising a pattern projecting unit, a pattern image pickup unit capable of relatively displacing with respect to the pattern projecting unit and a control unit, wherein the pattern projecting unit projects a displacement detecting pattern to the pattern image pickup unit, the pattern image pickup unit picks up the displacement detecting pattern as projected, the control unit circulates image of the displacement detecting pattern picked up by the pattern image pickup unit to the pattern projecting unit, updates the displacement detecting pattern projected by the pattern projecting unit to the displacement detecting pattern as circulated, and projects the displacement detecting pattern as updated to the pattern image pickup unit, wherein relative displacement between the pattern projecting unit and the pattern image pickup unit is obtained by dividing a displacement amount of the displacement detecting pattern in the image acquired by circulation by the number of circulations.

8 Claims, 8 Drawing Sheets

(51) Int. Cl.
    *G01B 11/26*    (2006.01)
    *G06K 9/52*     (2006.01)
    *G06T 7/60*     (2017.01)
    *G01B 11/00*    (2006.01)

(52) U.S. Cl.
    CPC ........... *G01D 5/34715* (2013.01); *G06K 9/52* (2013.01); *G06T 7/60* (2013.01)

(56) References Cited

U.S. PATENT DOCUMENTS

| | | | |
|---|---|---|---|
| 2013/0155225 A1 | 6/2013 | Kumagai et al. | |
| 2013/0156330 A1* | 6/2013 | Kane | G06K 9/00201 382/218 |
| 2014/0204083 A1* | 7/2014 | Thomson | G06T 5/006 345/420 |

FOREIGN PATENT DOCUMENTS

| | | |
|---|---|---|
| JP | 2013-134220 A | 7/2013 |
| JP | 2013-246110 A | 12/2013 |
| WO | 2008/039066 A1 | 4/2008 |

\* cited by examiner

DISPLACEMENT MEASURING METHOD AND DISPLACEMENT MEASURING DEVICE

BACKGROUND OF THE INVENTION

The present invention relates to a displacement measuring method and a displacement measuring device for measuring displacement and deflection angle by using images.

Conventionally, a displacement and a deflection angle have been measured by projecting a predetermined pattern to an image sensor and by detecting a change.

In order to measure a displacement and a deflection angle with high precision, a high precision is required for the predetermined pattern, which is used as reference, and a pattern, which is a negative by elect lithography, has been used.

Further, in the measurement of deflection angle, the relationship between a projecting system and an image pickup system is rotated. When there is distortion in the image projecting system and the image pickup system, the distortion of the image is changed according to the rotation, and a low distortion has been required on the image (image pickup and image projection) device and an optical system to be used in the projecting system and the image pickup system.

For this reason, it has been costly to have a device, which enables to detect displacement and deflection angle with high precision.

SUMMARY OF THE INVENTION

It is an object of the present invention to provide a method for measuring displacement and a displacement measuring device, by which it is possible to measure displacement with simple arrangement and with high precision.

To attain the object as described above, in a method to measure displacement according to the present invention in a displacement measuring device which comprises a pattern projecting unit provided at one site of a part capable of relatively displacing and a pattern image pickup unit provided at the other site, comprising a step of projecting a displacement detecting pattern from the pattern projecting unit to the pattern image pickup unit, a step of circulating the displacement detecting pattern acquired at the pattern image pickup unit to the pattern projecting unit, a step of updating the displacement detecting pattern of the pattern projecting unit by the displacement detecting pattern as circulated, a step of projecting the displacement detecting pattern as updated, and a step of obtaining displacement amount of the displacement detecting pattern in an image acquired by the pattern image pickup unit after circulation and of obtaining a displacement between two sites by dividing the displacement amount by the number of circulations.

Further, in a displacement measuring device according to the present invention, comprising a pattern projecting unit, a pattern image pickup unit provided so as to be capable of relatively displacing with respect to the pattern projecting unit and a control unit, wherein the pattern projecting unit is capable of projecting a displacement detecting pattern to the pattern image pickup unit, the pattern image pickup unit is capable of picking up the displacement detecting pattern as projected, the control unit is adopted to circulate image of the displacement detecting pattern picked up by the pattern image pickup unit to the pattern projecting unit, to update the displacement detecting pattern projected by the pattern projecting unit to the displacement detecting pattern as circulated, and further to project the displacement detecting pattern as updated to the pattern image pickup unit, wherein a relative displacement between the pattern projecting unit and the pattern image pickup unit is obtained by dividing a displacement amount of the displacement detecting pattern in the image acquired by circulation by the number of circulations.

Further, in a displacement measuring device according to the present invention, wherein the relative displacement is a rotation-displacement.

Further, in a displacement measuring device according to the present invention, wherein the relative displacement is a linear displacement.

Further, in a displacement measuring device according to the present invention, wherein the relative displacement is a composite displacement including a rotation-displacement and a linear displacement.

Further, in a displacement measuring device according to the present invention, wherein the control unit rotates an image for each circulation by 360°/the number of circulations.

Furthermore, in a displacement measuring device according to the present invention, wherein the displacement detecting pattern has a circular pattern as centering pattern at central part, and a line-segment pattern arranged concentrically with the circular pattern around the circular pattern as a pattern for angle detection.

According to the present invention, a method to measure displacement in a displacement measuring device which comprises a pattern projecting unit provided at one site of a part capable of relatively displacing and a pattern image pickup unit provided at the other site, comprising a step of projecting a displacement detecting pattern from the pattern projecting unit to the pattern image pickup unit, a step of circulating the displacement detecting pattern acquired at the pattern image pickup unit to the pattern projecting unit, a step of updating the displacement detecting pattern of the pattern projecting unit by the displacement detecting pattern as circulated, a step of projecting the displacement detecting pattern as updated, and a step of obtaining displacement amount of the displacement detecting pattern in an image acquired by the pattern image pickup unit after circulation and of obtaining a displacement between two sites by dividing the displacement amount by the number of circulations. As a result, it is possible to perform measurement in simple arrangement and with high precision, and further, to measure a fine displacement.

Further, according to the present invention, a displacement measuring device, comprising a pattern projecting unit, a pattern image pickup unit provided so as to be capable of relatively displacing with respect to said pattern projecting unit and a control unit, wherein the pattern projecting unit is capable of projecting a displacement detecting pattern to the pattern image pickup unit, the pattern image pickup unit is capable of picking up the displacement detecting pattern as projected, the control unit is adopted to circulate image of the displacement detecting pattern picked up by the pattern image pickup unit to the pattern projecting unit, to update the displacement detecting pattern projected by the pattern projecting unit to the displacement detecting pattern as circulated, and further to project the displacement detecting pattern as updated to the pattern image pickup unit, wherein a relative displacement between the pattern projecting unit and the pattern image pickup unit is obtained by dividing a displacement amount of the displacement detecting pattern in the image acquired by circulation by the number of circulations. As a result, it is possible to perform measurement in simple arrangement and with high precision, and further, to measure a fine displacement.

Further, according to the present invention, a displacement measuring device, wherein the control unit rotates an image for each circulation by 360°/the number of circulations. As a result, it is possible to measure a rotation-displacement, in which the influence of distortion of the projecting system and the image pickup system on the image is reduced.

Furthermore, according to the present invention, a displacement measuring device wherein the displacement detecting pattern has a circular pattern as centering pattern at central part, and a line-segment pattern arranged concentrically with the circular pattern around the circular pattern as a pattern for angle detection. As a result, when the control unit rotates the image by 360°/the number of circulation per a circulation, by rotating around the centering pattern as the center, it is possible to measure a rotation-displacement where an influence of distortion between the projecting system and the image pickup system around the centering pattern as the center is reduced, and further, a linear displacement can be measured from the change of the centering pattern, and a composite displacement can be measured at the same time.

BRIEF DESCRIPTION OF THE DRAWINGS

FIG. 2A to FIG. 2H each is an explanatory drawing to explain an operation of the first embodiment.

FIG. 4A to FIG. 4D each is an explanatory drawing to explain an operation of the second embodiment.

FIG. 6A to FIG. 6I each is an explanatory drawing to explain an operation of the third embodiment.

DETAILED DESCRIPTION OF THE PREFERRED EMBODIMENT

Description will be given on an embodiment of the present invention by referring to the attached drawings.

First, referring to FIG. 1, a description will be given on a first embodiment of the present invention.

Figure 1:
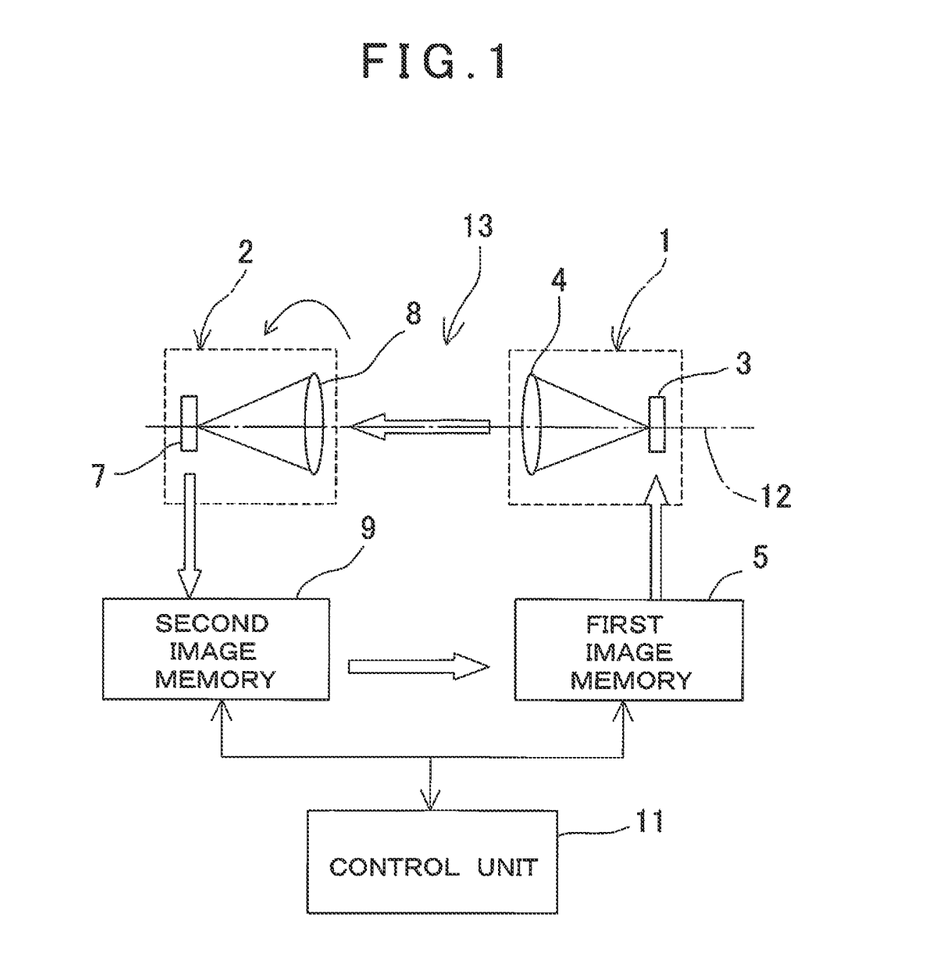
FIG. 1 is a schematical block diagram of a first embodiment of the present invention.

In FIG. 1, reference numeral 1 denotes a pattern projecting unit, and numeral 2 denotes a pattern image pickup unit.

The pattern projecting unit 1 further comprises a display 3 for displaying a pattern for projection, a projection optical system 4, and a first image memory 5 to store a pattern to be displayed on the display 3. As the display 3, a liquid crystal display, an organic liquid crystal display, a plasma display, or a Braun tube or the like is used, and the one, which can display a pattern, is selected and used depending on the purpose for the use. A pattern for displacement detection is stored in the first image memory 5.

The pattern image pickup unit 2 comprises an image pickup sensor 7 for picking up an image of a pattern as projected, a photodetection optical system 8 for guiding the image to the image pickup sensor 7, and a second image memory 9 for storing an image picked up by the image pickup sensor 7. As the image pickup sensor 7, CCD or CMOS sensor or the like is used.

Further, in the figure, reference numeral 11 denotes a control unit, and the control unit 11 controls writing and reading image data to and from the first image memory 5, and also controls writing and reading the image data to and from the second image memory 9. Further, the control unit 11 calculates a deflection angle (i.e. a rotation angle of the pattern image pickup unit 2 with respect to the pattern projecting unit 1) (hereinafter referred as rotation displacement) based on the image acquired by the image pickup sensor 7.

The pattern projecting unit 1 and the pattern image pickup unit 2 are disposed along the same optical axis 12, and further, the pattern image pickup unit 2 can be rotated around the optical axis 12 as the center. The pattern image pickup unit 2 is provided on an object to be measured (not shown).

For sending and receiving a signal between the pattern projecting unit 1 and the pattern image pickup unit 2, means such as a wireless communication, an optical communication or the like are used. Further, in a case where a limited angle is measured, a wired communication may also be used.

An optical system 13, which comprises the projection optical system 4 and the photodetection optical system 8, is an image forming optical system (magnification power of 1:1) with a parallel light. Further, the optical system 13 is so arranged that positional relationship of the pattern projecting unit 1 and the pattern image pickup unit 2 does not exert influence on the image. Further, under the condition that the pattern projecting unit 1 and the pattern image pickup unit 2 directly face to each other, the optical system 13 is arranged so that an image displayed on the display 3 is not to be an inverted image on the image pickup sensor 7. An example of the arrangement is such that the pattern projecting unit 1 is rotated in advance by 180° or the like.

Further, on the image pickup sensor 7, a reference line 17 (or a coordinate axis) (see FIG. 2A to FIG. 2H) is set up, and the control unit 11 determines a rotation angle of the pattern image pickup unit 2 according to the reference line 17 and a displacement detecting pattern 15 as projected (see FIG. 2A to FIG. 2H).

Next, a description will be given on an operation of the first embodiment by referring to FIG. 2A to FIG. 2H.

In the description as given below, a condition is described where the pattern image pickup unit 2 is rotated by a predetermined angle with respect to the pattern projecting unit 1. In FIG. 2A to FIG. 2H, the display 3 and the image pickup sensor 7 are shown, and the image pickup sensor 7 is rotation-displaced in leftward direction by 10° with respect to the pattern projecting unit 1.

Figure 2A:
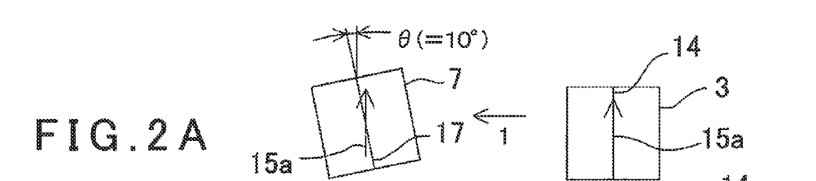

The control unit 11 reads a displacement detecting pattern from the first image memory 5 and displays on the display 3 as a displacement detecting pattern 15a. By the optical system 13, the displacement detecting pattern 15a is projected on the image pickup sensor 7, and a projection image of the displacement detecting pattern 15a is acquired by the image pickup sensor 7.

Because the image pickup sensor 7 is rotation-displaced by 10≥ in leftward direction, the displacement detecting pattern 15a as projected on the image pickup sensor 7 is rotated in rightward direction (in clockwise direction) by 10° with respect to the image pickup sensor 7 (the reference line 17 as given above). Therefore, the displacement detecting pattern 15a in the projection image as acquired from the image pickup sensor 7 is an image, which is rotated in rightward direction by 10° with respect to the reference line 17 (FIG. 2A).

The control unit 11 stores the projection image as acquired to the second image memory 9 and sends the projection image to the first image memory 5 and stores the projection image in the first image memory 5. Further, the control unit 11 displays the projection image as stored in the first image memory 5 on the display 3 as a displacement detecting pattern 15b. Therefore, the displacement detecting pattern displayed on the display 3 is updated to the displacement detecting pattern 15b from the displacement detecting pattern 15a (FIG. 2B).

The control unit 11 circulates the displacement detecting pattern 15b as projected to the image pickup sensor 7 and picked up to the display 3 via the second image memory 9 and the first image memory 5. Here, the following is regarded as one circulation. The image displayed on the display 3 is projected to the image pickup sensor 7, and further, the image acquired by the image pickup sensor 7 is stored in the first image memory 5 and is displayed on the display 3 again.

Figures 2B, 2C:
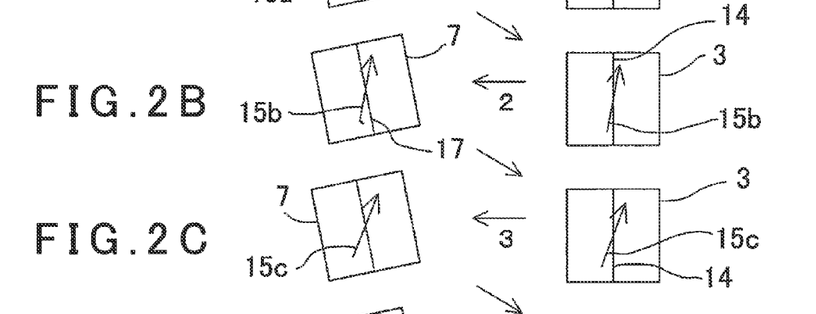

The displacement detecting pattern 15b as displayed on the display 3 via a circulation is rotated in rightward direction by 10° with respect to a reference line 14 of the display 3 (FIG. 2B).

Further, the displacement detecting pattern 15b is projected to the image pickup sensor 7, and the projection image is acquired by the image pickup sensor 7 as a displacement detecting pattern 15c. Because the image pickup sensor 7 is rotation-displaced by 10°, the displacement detecting pattern 15c as projected on the image pickup sensor 7 is rotated further by 10° with respect to the image pickup sensor 7. That is, the displacement detecting pattern 15c is rotated by 20° with respect to the reference line 17 on the image pickup sensor 7 (FIG. 2B).

Similarly to the description as described above, the control unit 11 overwrites the displacement detecting pattern 15c on the second image memory 9 by the projection image acquired by the image pickup sensor 7. Further, the projection image is transferred to the first image memory 5, and the image of the first image memory 5 is overwritten by the displacement detecting pattern 15c. Further, the control unit 11 displays the displacement detecting pattern 15c on the display 3 (FIG. 2C).

In the second circulation, the displacement detecting pattern 15c as displayed on the display 3 is rotated by 20° with respect to the reference line 14 of the display 3. Further, by projecting the displacement detecting pattern 15c of the display 3 on the image pickup sensor 7, the displacement detecting pattern 15c as projected is rotated by 30° with respect to the reference line 17 of the image pickup sensor 7 (FIG. 2C).

Figures 2D, 2E:
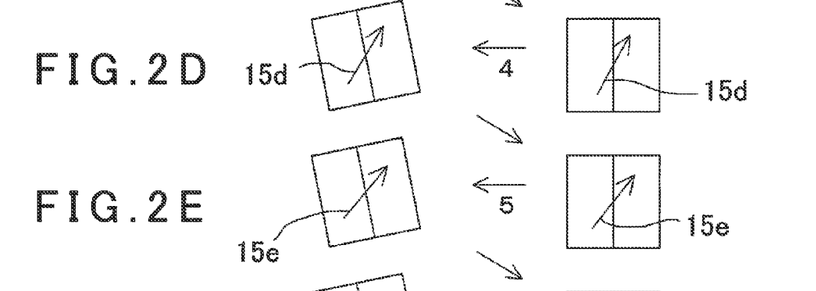
Figure 2F:
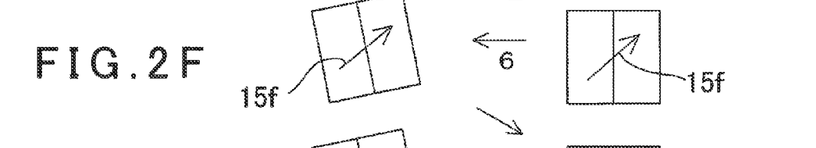
Figure 2G:
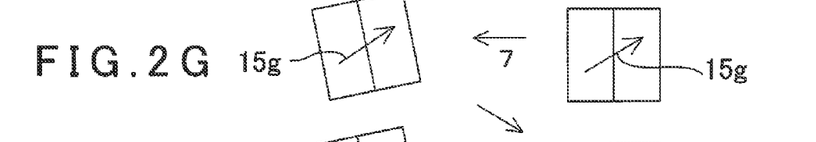

Further, the control unit 11 acquires the projection image from the image pickup sensor 7, circulates the projection image, and displays the projection image on the display 3 as a displacement detecting pattern 15d. In the third circulation, the displacement detecting pattern 15d as displayed on the display 3 is rotated by 30° with respect to the reference line 14 of the display 3 (FIG. 2D).

When the displacement detecting pattern 15d is projected on the image pickup sensor 7, the displacement detecting pattern 15d as displayed is rotated by 40° with respect to the reference line 17 of the image pickup sensor 7.

Therefore, rotation angle of the displacement detecting pattern 15 as projected to the image pickup sensor 7 with respect to the reference line 17 is increased by rotation-displacement of the image pickup sensor 7 each time the image is circulated.

That is to say, if it is supposed that the number of circulations is n times, a rotation angle $\omega$ of the displacement detecting pattern 15 as projected on the image pickup sensor 7 with respect to the reference line 17 is obtained as $\omega = n\theta$ where a rotation-displacement angle of the pattern image pickup unit 2 with respect to the pattern projecting unit 1 is $\theta$.

Figure 2H:
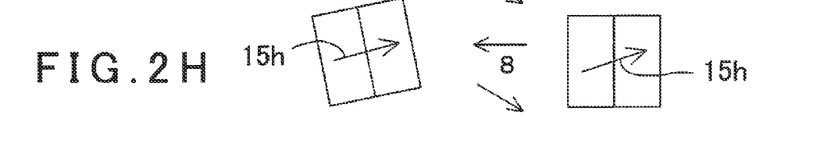

In the example shown in FIG. 2H, an image data is circulated 8 times, and the rotation angle of a displacement detecting pattern 15h as projected finally with respect to the reference line of the image pickup sensor 7 becomes: $80° = 10° \times 8$ (FIG. 2H).

In a case where the angle $\theta$ is measured as an unknown value, by measuring the rotation angle $\omega$ of the displacement detecting pattern 15 with respect to the image pickup sensor 7 from the image and by dividing the rotation angle $\omega$ by (the number of circulations n), the angle $\theta$ can be measured. In the value of $\theta$ thus obtained, the same result is obtained in a case where the measurement is made by n times and average value is obtained. As a result, a measurement precision is improved.

Further, there is theoretically no limit to the number of circulations, and the number of circulations may be several thousand times or several tens of thousand times more. For instance, in a case where rotation-displacement angle of the image pickup sensor 7 is a fine angle of 0.00001°, and if it is supposed that the number of circulations is 100,000 times, the rotation angle obtained ultimately is 1°. By dividing this rotation angle $\omega$ by 100,000, the fine rotation angle of the image pickup sensor 7 can be measured. That is to say, even a fine angle, which cannot be detected by the displacement detecting pattern 15, can be measured with high precision.

The displacement detecting pattern 15 is given merely as an example, and various types of the displacement detecting patterns 15 can be adopted.

Further, in the embodiment as described above, the rotation angle $\omega$ is obtained according to the image acquired by the image pickup sensor 7, while the rotation angle $\omega$ and further the angle $\theta$, may be measured according to the image stored in the first image memory 5 because the image transferred to the first image memory 5 is the same as the image acquired by the image pickup sensor 7.

The description as given above refers to the rotation-displacement of the pattern image pickup unit 2 with respect to the pattern projecting unit 1, while a similar measurement may be made to displacement in straight line with respect to the pattern projecting unit 1 of the pattern image pickup unit 2.

Further, in the description as given above, it is supposed that the pattern image pickup unit 2 is rotated and the pattern projecting unit 1 is fixed, while the same result can be obtained in a case where the pattern image pickup unit 2 is fixed and the pattern projecting unit 1 is rotated. According to the present invention, it is possible to measure relative rotation-displacement between the pattern projecting unit 1 and the pattern image pickup unit 2.

Figure 3:
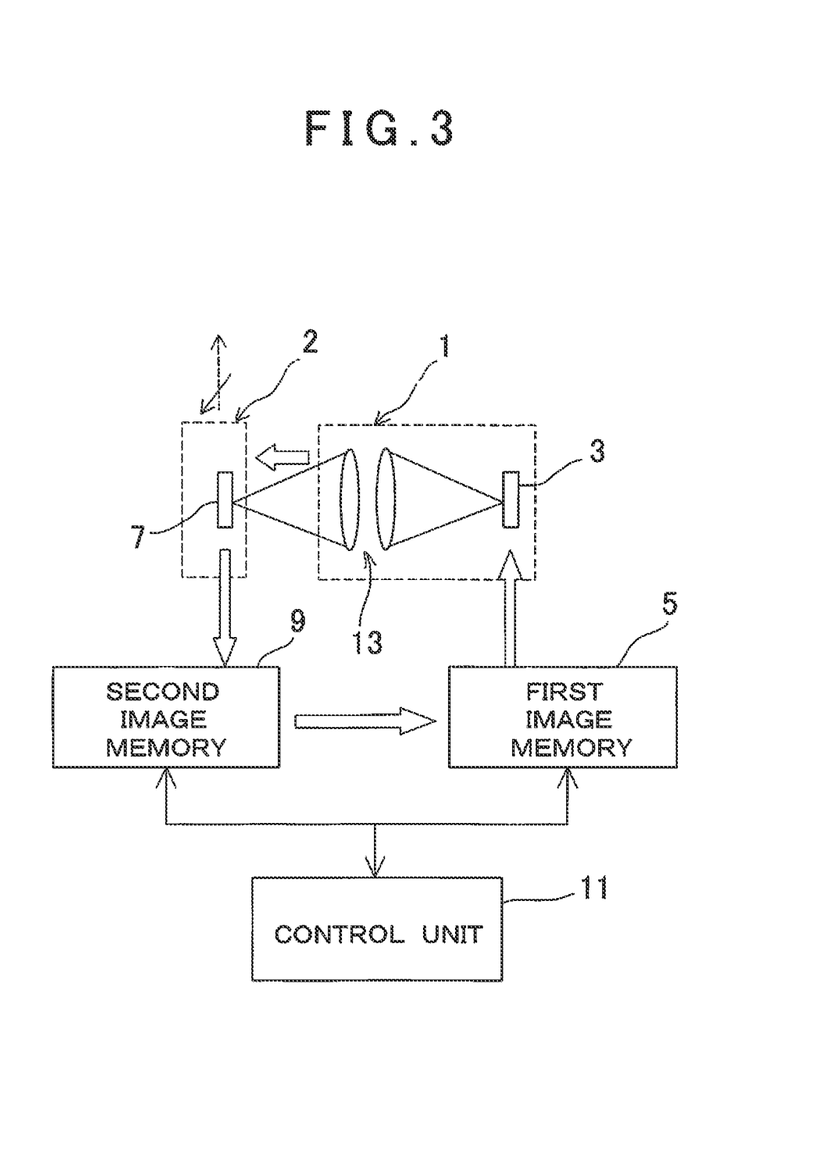
FIG. 3 is a schematical block diagram of a second embodiment of the present invention.

Referring to FIG. 3, a description will be given below on a second embodiment to measure linear displacement.

In FIG. 3, the same component as shown in FIG. 1 is referred by the same symbol, and detailed description is not given here.

In FIG. 3, reference numeral 1 denotes a pattern projecting unit, and reference numeral 2 denotes a pattern image pickup unit, and the pattern projecting unit 1 comprises a display 3, an optical system 13, and a first image memory 5. The pattern image pickup unit 2 comprises an image pickup sensor 7 and a second image memory 9. A pattern for displacement detection is stored in the first image memory 5. The pattern image pickup unit 2 can be displaced linearly with respect to the pattern projecting unit 1.

Under the condition where the pattern projecting unit 1 and the pattern image pickup unit 2 are directly faced to each other (i.e. in the condition where relative displacement is not present between the pattern projecting unit 1 and the pattern image pickup unit 2), the display 3 and the pattern image pickup unit 2 are positioned on optical axis of the optical system 13.

The optical system 13 projects a displacement detecting pattern 15 (see FIG. 4A to FIG. 4D) displayed on the display 3 on the image pickup sensor 7. Further, the optical system 13 is so arranged that an image to be projected to the image pickup sensor 7 is not an inverted image. For instance, the displacement detecting pattern 15 to be displayed on the display 3 is rotated by 180°. Further, it is desirable that the optical system 13 is designed as tele-centric optical system so that the change of distance between the pattern projecting unit 1 and the pattern image pickup unit 2 does not exert influence on the measurement.

In FIG. 4A to FIG. 4D, it is supposed that the pattern image pickup unit 2 is displaced by Δ in horizontal direction (in the figure, in rightward direction) with respect to the pattern projecting unit 1.

Figure 4A:
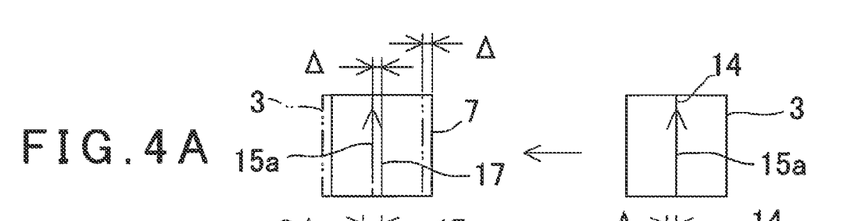

A displacement detecting pattern 15a stored in the first image memory 5 is displayed on the display 3. Further, the displacement detecting pattern 15a is positioned on a reference line 14 of the display 3.

When the displacement detecting pattern 15a is projected on the image pickup sensor 7 by the optical system 13, the image pickup sensor 7 is displaced in rightward direction by an amount of Δ. Therefore, the displacement detecting pattern 15a as projected is at a position, which is displaced in leftward direction from a reference line 17 of the image pickup sensor 7 by an amount of Δ (FIG. 4A).

Figure 4B:
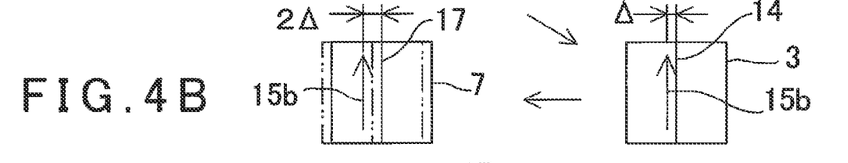

A projection image is picked up by the image pickup sensor 7, and the image is stored in de second image memory 9. The control unit 11 transfers the image stored in the second image memory 9 to the first image memory 5 and stores the image in the first image memory 5. Further, the control unit 11 displays the image stored in the first image memory 5 as a displacement detecting pattern 15b on the display 3. The displacement detecting pattern as displayed on the display 3 is updated from the displacement detecting pattern 15a to the displacement detecting pattern 15b. Further, the displacement detecting pattern 15b is displayed at a position as displaced by an amount of Δ in leftward direction from the reference line 14 of the display 3 (FIG. 4B).

That is to say, the control unit 11 circulates the displacement detecting pattern 15 as projected to the image pickup sensor 7 and picked up to the display 3 via the second image memory 9 and the first image memory 5.

Further, the displacement detecting pattern 15b is projected on the image pickup sensor 7, and an image of the displacement detecting pattern 15b is acquired by the image pickup sensor 7 as a projected image. The displacement detecting pattern 15b as projected to the image pickup sensor 7 is displaced in leftward direction by an amount of Δ with respect to the reference line 17. That is to say, on the image pickup sensor 7, the displacement detecting pattern 15b is displaced by an amount of 2×Δ with respect to the reference line 17 (FIG. 4B).

Figure 4C:
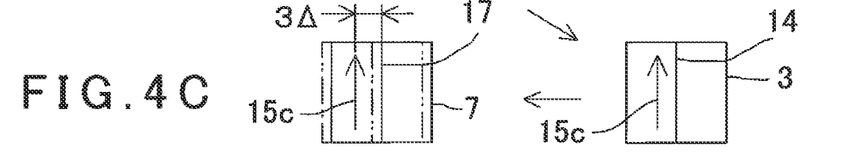
Figure 4D:
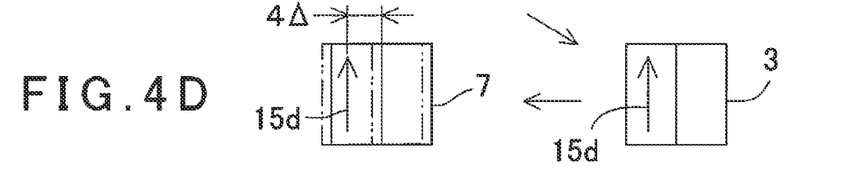

Therefore, each time the circulation is carried out, the displacement detecting pattern 15 displayed on the image pickup sensor 7 is displaced by an amount of Δ with respect to the reference line 17 of the image pickup sensor 7 (FIG. 4C and FIG. 4D).

Therefore, after the circulation is carried out "n" times, the control unit 11 measures a displacement based on an image acquired by the image pickup sensor 7. In FIG. 4A to FIG. 4D, a circulation is performed by four times, and the displacement finally obtained is 4Δ. When 4Δ is divided by 4, the value of Δ can be determined.

In the present embodiment, it is the same as the case where the displacement Δ is measured "n" times and the average value is taken. As a result, measurement precision is improved. Further, the number of circulations can be increased as far as the displacement detecting pattern 15 as projected on the image pickup sensor 7 does not go beyond a picking up range of the image pickup sensor 7. Therefore, it is possible to measure a fine displacement, which cannot be detected by the displacement detecting pattern 15 itself.

It is to be noted that the displacement detecting pattern 15 is given as an example, and various types of the displacement detecting pattern 15 can be adopted.

Figure 5:
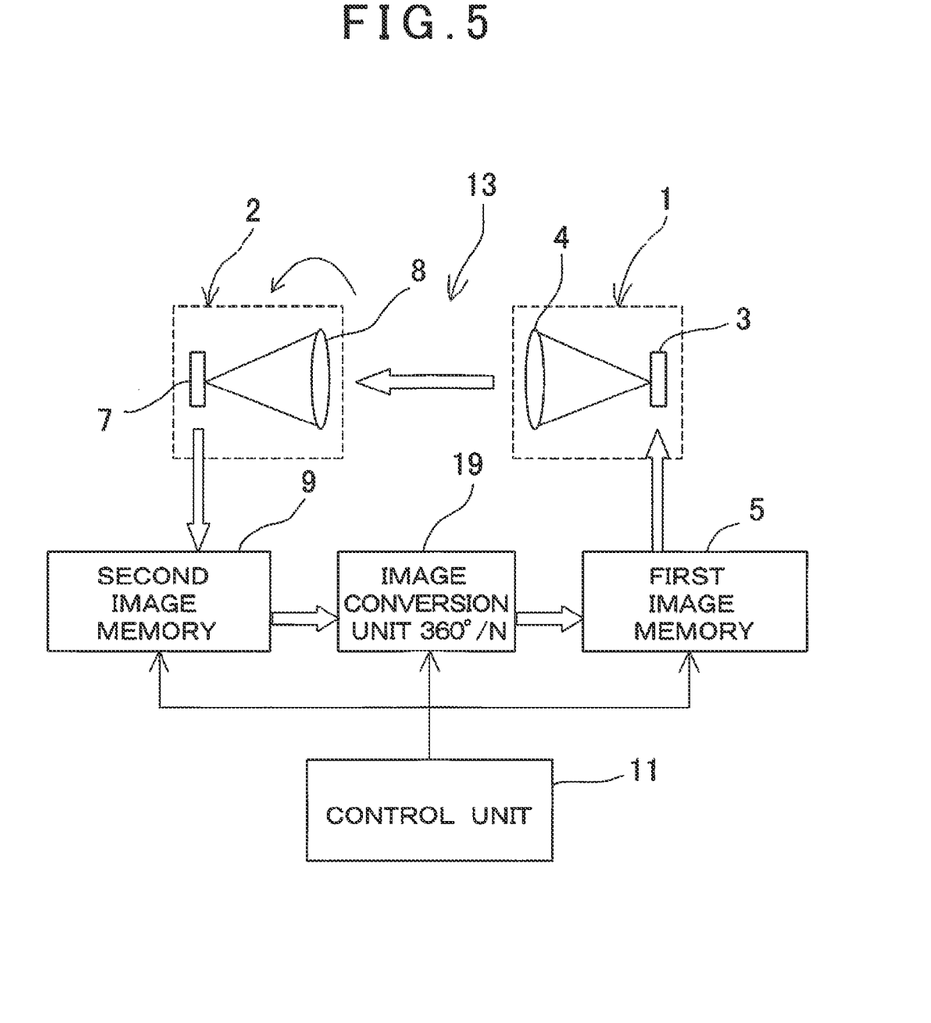
FIG. 5 is a schematical block diagram of a third embodiment of the present invention.

FIG. 5 shows a third embodiment. In FIG. 5, the same component as shown in FIG. 1 is referred by the same symbol, and detailed description is not given here.

In the third embodiment, compared with the first embodiment, an image conversion unit 19 is provided further.

The image conversion unit 19 rotates an image for each circulation at an angle, which is given by equally dividing 360° by N (integral number). A control unit 11 controls: projecting by a pattern projecting unit 1, picking up the image by a pattern image pickup unit 2, capturing and reading out the image of a second image memory 9, rotating of the image by the image conversion unit 19, sending the image to a first image memory 5, reading out the image from the first image memory 5, and controlling the display to a display 3, and the control unit 11 is adopted to circulate the process N times.

A deflection angle due to this rotation can be detected as a value N times by the circulation of N times, and an influence of distortion from a projecting system and an image pickup system on the image can be reduced. Further, by increasing the value of N, the influence can be substantially removed.

Since an image rotation is brought back by the rotation of N times to the initial condition by image conversion, the image conversion does not exert influence on angle detection. Further, since the image is rotated by N times with respect to the projecting system and the image pickup system, the distortion of the image as circulated N times regarding the rotating direction of the projecting system and image pickup system is averaged, and the influence of distortion is decreased according to the number of circulations.

Referring to FIG. 6A to FIG. 6I, a description will be given below on operation of the third embodiment.

Figure 6A:
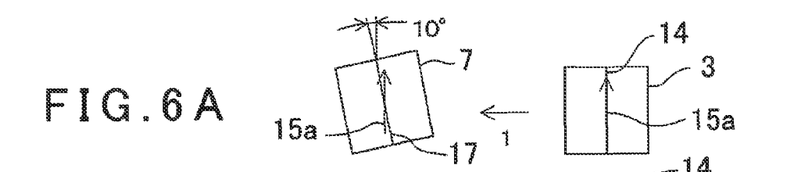
Figure 6B:
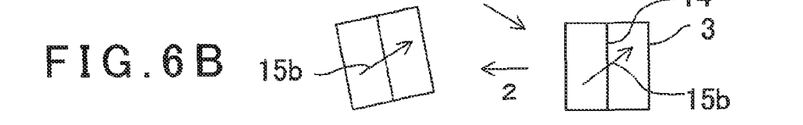
Figure 6C:
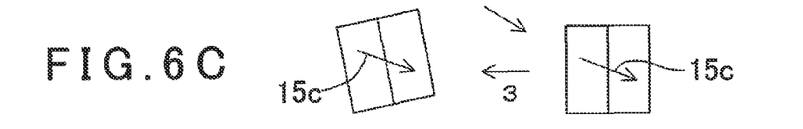
Figure 6D:
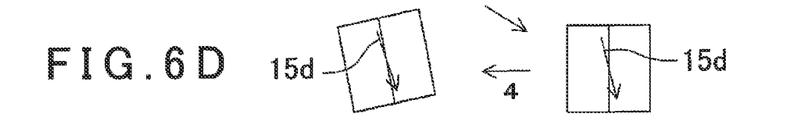
Figure 6E:
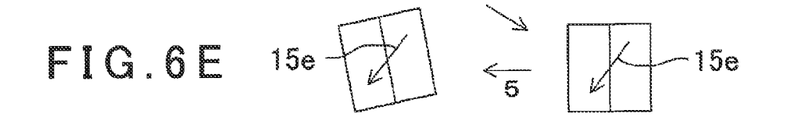
Figure 6F:
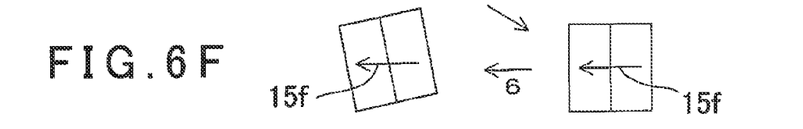
Figure 6G:
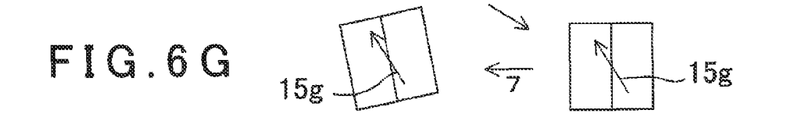
Figure 6H:
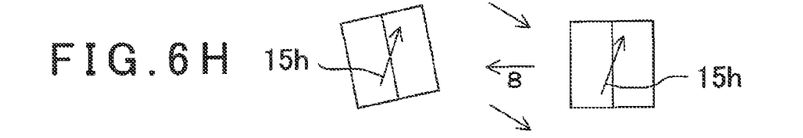
Figure 6I:
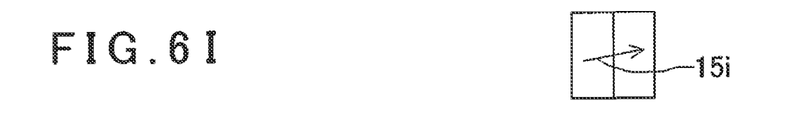

In the description as given below, the pattern image pickup unit 2 is under the condition where the pattern image pickup unit 2 is rotated by a predetermined angle (θ=10°) with respect to the display 3. In the figure, the display 3 and the image pickup sensor 7 are shown, and the image pickup sensor 7 is rotation-displaced in leftward direction by 10° with respect to the pattern projecting unit 1. Further, it is supposed that a circulation is repeated by 8 times. Therefore, by one circulation, the angle of the image rotation is: (360°/8=45°).

A displacement detecting pattern 15a is displayed on the display 3, and the displacement detecting pattern 15a is projected on the image pickup sensor 7. Since the image pickup sensor 7 is rotation-displaced in leftward direction by 10°, the displacement detecting pattern 15a as projected to the image pickup sensor 7 is rotated by 10° in rightward direction (in clockwise direction) with respect to the image pickup sensor 7 (a reference line 17).

A projection image of the displacement detecting pattern 15a is acquired by the image pickup sensor 7, and the projection image is circulated to the first image memory 5 via the image conversion unit 19. During the process of circulation, the projection image is rotated by 45° at the image conversion unit 19.

A displacement detecting pattern 15b as rotated is displayed on the display 3, and the displacement detecting pattern 15b is rotated by (10°+45°=55°) with respect to a reference line 14 of the display 3.

Similarly, the circulation is performed by 8 times in all. For each circulation, displacement detecting patterns 15c, 15d, 15e, 15f, 15g, 15h and 15i to be displayed on the display 3 are rotated sequentially by (20°+90°), (30°+135°), (40°+180°), (50°+225°), (60°30 270°), (70°+315°), and (80°+360°) with respect to the reference line 14.

Because the image is rotated by 360° due to circulation of 8 times, an angle ω to be obtained will be the rotation-displacement of θ×8. When the angle ω as obtained is divided by the number of circulations (i.e. 8), a rotation-displacement θ of the pattern image pickup unit 2 with respect to the pattern projecting unit 1 can be obtained.

Figure 7:
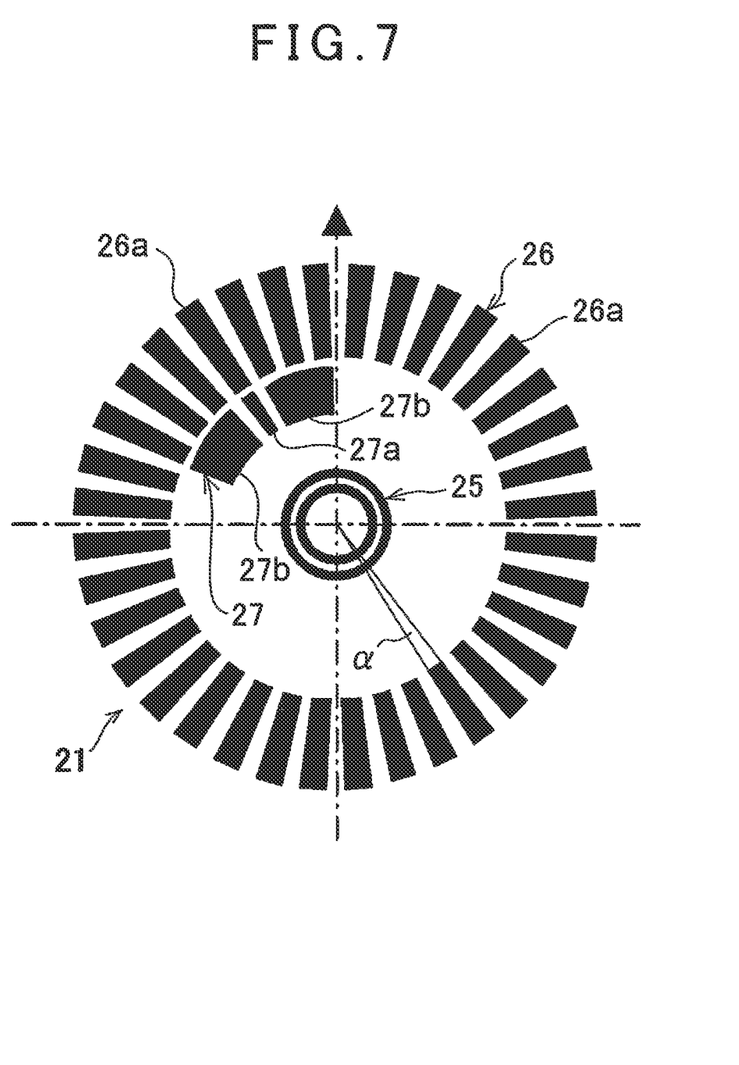
FIG. 7 is a drawing to show a displacement detecting pattern used in the present invention.

Next, a description will be given on an example of the displacement detecting pattern to be used in the above embodiment.

The present applicant has proposed a displacement detecting pattern 21 as given below by the Japanese Patent Application Publication 2013-246110.

Basic shape of the displacement detecting pattern 21 is a circle, and it is so arranged that the center of the displacement detecting pattern 21 is approximately aligned with optical axis of an optical system.

The displacement detecting pattern 21 comprises a circular pattern 25 given as a centering pattern at the central part, a line-segment pattern 26 as provided concentrically with the circular pattern 25 around the circular pattern 25 as a pattern for angle detection, and a reference indicating pattern 27. The circular pattern 25 is represented by a plurality of true roundness each drawn with a predetermined line width (two concentric multiple circles in the figure). It is essential only that the centering pattern is a pattern, from which the center can be determined, so a cross line may be used for instance.

The line-segment pattern 26 is so arranged that "n" line-segments 26a each with a predetermined length and extending in radial direction (in the figure, the part shown in black) are positioned over total circumference with equal angular pitch, and further, the line-segment pattern 26 is a track in shape of ring formed by the line-segments 26a. Each of the line-segments 26a is designed in form of wedge, and has a central angle α of 360°/2n. Further, the center of the line-segment pattern 26 is identical with the center of the circular pattern 25.

The reference indicating pattern 27 is formed inside the line-segment pattern 26 and is in circular shape and is concentric to the line-segment pattern 26. Further, the reference indicating pattern 27 is divided to a plurality of patterns in circumferential direction, and the reference indicating pattern 27 comprises one position indicating pattern 27a and direction indicating patterns 27b as arranged on either side of the position indicating pattern 27a. The reference indicating pattern 27 fulfills the function to indicate a reference position of the rotation of the displacement detecting pattern 21.

The line-segment 26a, the position indicating pattern 27a, and the direction indicating pattern 27b may be designed as non-reflective to light, and other parts may be designed as reflective. Or, the line-segment 26a, the position indicating pattern 27a and the direction indicating pattern 27h may be designed as reflective, and other parts may be designed as non-reflective. In the description as given below, it is described that the line-segment 26a, the position indicating pattern 27a, and the direction indicating pattern 27b are non-reflective.

According to the displacement detecting pattern 21, a rotation-displacement can be measured by detecting the displacement in rotating direction of the line-segment pattern 26. Further, according to the displacement detecting pattern 21, a deviation of the center position of the displacement detecting pattern 21 can be detected by the circular pattern 25, which is a linear displacement can be measured.

Figure 8:
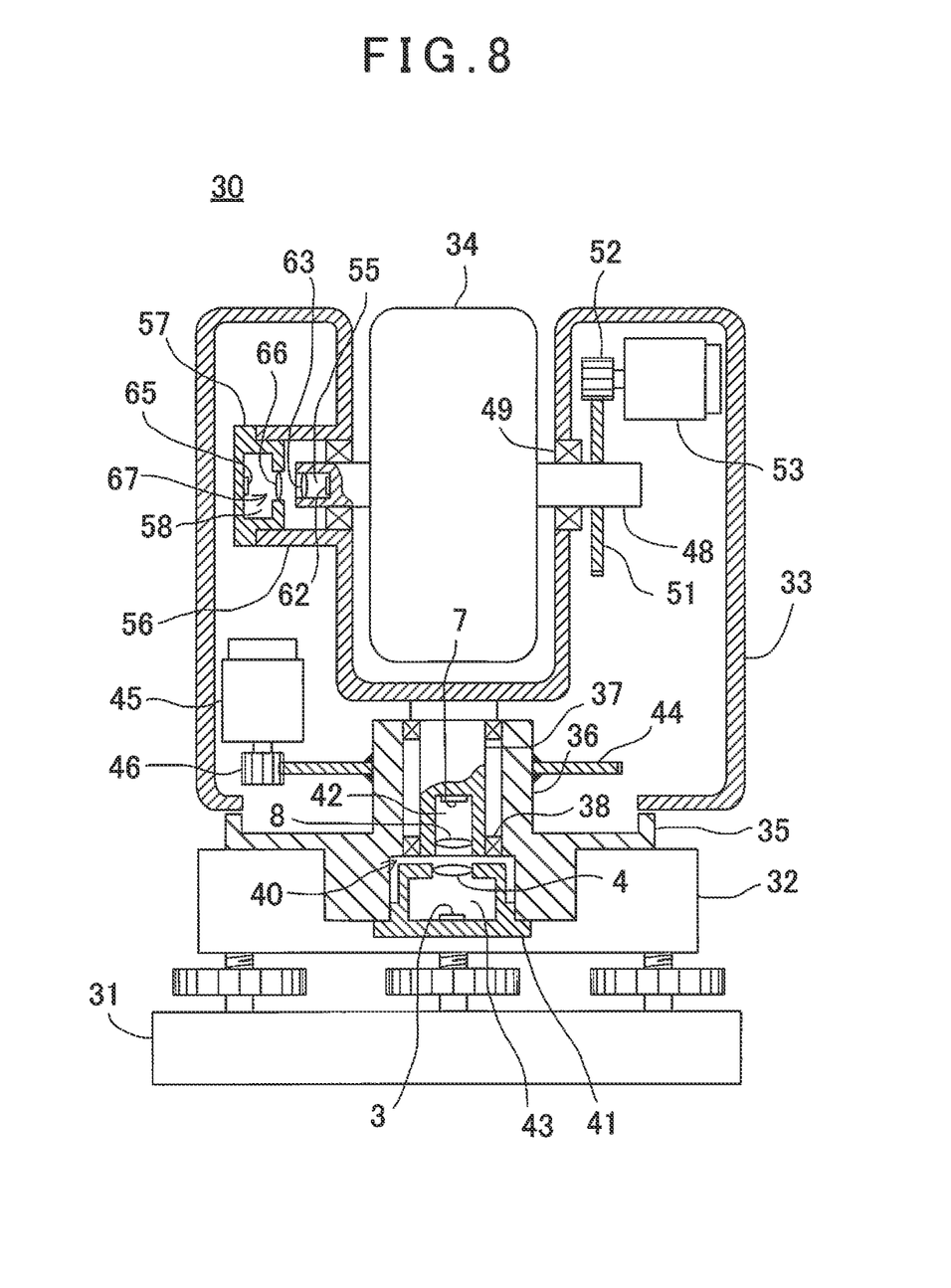
FIG. 8 is a cross-sectional view to show an example of a device, to which the present invention is applied.

FIG. 8 shows a case where the rotation-displacement and linear displacement measuring device according to the present embodiment is used in a surveying instrument. Further, a total station 30 is shown as one example of the surveying instrument.

In FIG. 8, reference numeral 31 denotes a leveling unit, reference numeral 32 denotes a base unit, reference numeral 33 denotes a frame case, and reference numeral 34 denotes a telescope unit.

A frame base 35 is provided on the base unit 32, and a hollow shaft 36 is protruded in upward direction from the frame base 35. In the hollow shaft 36, a rotation shaft 37 of the frame case 33 is rotatably engaged with the hollow shaft 36 via a bearing 38. The frame base 35 as a rotating unit is rotated in horizontal direction around the rotation shaft 37.

From lower surface of the frame base 35, a shaft holder 41 is fitted to the frame base 35. The shaft holder 41 is disposed so as to oppose to lower end part of the rotation shaft 37 and is arranged coaxially to the rotation shaft 37.

In lower end part of the rotation shaft 37, a shaft portion space 42 is formed in a holder space 43 is formed in the shaft holder 41.

A pattern image pickup unit, i.e. an image pickup sensor 7 and a photodetection optical system 8, are provided in the shaft portion space 42. A pattern projecting unit, i.e. a display 3 and a projection optical system 4, are provided in the holder space 43.

The image pickup sensor 7, the photodetection optical system 8, the display 3, and the projection optical system 4 are provided on an axis of the rotation shaft 37. Optical axes of the projection optical system 4 and the photodetection optical system 8 coincide with the axis of the rotation shaft 37.

The image pickup sensor 7, the photodetection optical system 8, the display 3, and the projection optical system 4 make up together a first displacement measuring device 40.

A horizontal rotation gear 44 is provided on the hollow shaft 36, and a horizontal rotation motor 45 is provided on the frame case 33. A horizontal driving gear 46 is fixed on an output shaft of the horizontal rotation motor 45, and the horizontal driving gear 46 is engaged with the horizontal rotation gear 44.

By driving the horizontal rotation motor 45, the frame case 33 is rotated in horizontal direction around the rotation shaft 37.

A rotation shaft 48 is extended in horizontal direction from the telescope unit 34, and the rotation shaft 48 is rotatably supported on the frame case 33 via a bearing 49. The telescope unit 34 as a rotating unit is rotated in vertical direction around the rotation shaft 48.

A vertical rotation gear 51 is fixed on the rotation shaft 48, and a vertical driving gear 52 is engaged with the vertical rotation gear 51. A vertical rotation motor 53 is provided on the frame case 33, and the vertical driving gear 52 is fixed on output shaft of the vertical rotation motor 53.

When the vertical rotation motor 53 drives rotation, the rotation shaft 48 is rotated via the vertical driving gear 52 and the vertical rotation gear 51, and together with the rotation shaft 48, the telescope unit 34 is rotated in vertical direction.

In one end part of the rotation shaft 48, a shaft unit space 55 is formed, and a hollow shaft support portion 56 is provided concentrically with the one end part on the frame case 33. A holder 57 is fitted to the shaft support portion 56, and a holder space 58 is formed in the holder 57. The holder 57 is opposed to one end part of the rotation shaft 48, and the holder 57 is positioned on axial of the rotation shaft 48.

A pattern image pickup unit, i.e. an image pickup sensor 62 and a photodetection optical system 63, is provided in the shaft unit space 55, and a pattern projecting unit, i.e. a display 65 and a projection optical system 66, is provided in the holder space 58. Optical axis of the photodetection optical system 63 and the projection optical system 66 coincide with the axis of the rotation shaft 48.

The image pickup sensor 62, the photodetection optical system 63, the display 65, and the projection optical system 66 make up together a second displacement measuring device 67.

Rotation and measurement of linear displacement by the first displacement measuring device 40 and by the second displacement measuring device 67 are the same as described above, so a detailed description is not given here.

Therefore, a rotation in horizontal direction and a linear displacement of the frame case 33 are measured by the first displacement measuring device 40 and a rotation in vertical direction and a linear displacement of the telescope unit 34 are measured by the second displacement measuring device 67.

The invention claimed is:

1. A method to measure displacement in a displacement measuring device, which comprises a pattern projecting unit provided at one site of a part capable of relatively displacing and a pattern image pickup unit provided at the other site, comprising a step of projecting a displacement detecting pattern from said pattern projecting unit to said pattern image pickup unit, a step of circulating said displacement detecting pattern acquired at said pattern image pickup unit to said pattern projecting unit, a step of updating said displacement detecting pattern of said pattern projecting unit by said displacement detecting pattern as circulated, a step of projecting said displacement detecting pattern as updated, and a step of obtaining displacement amount of said displacement detecting pattern in an image acquired by said pattern image pickup unit after circulation and of obtaining a displacement between two sites by dividing said displacement amount by the number of circulations.

2. A method according to claim 1, wherein said displacement between two sites is a rotation-displacement.

3. A method according to claim 1, wherein said displacement between two sites is a linear displacement.

4. A method according to claim 1, wherein said displacement between two sites is a composite displacement including a rotation-displacement and a linear displacement.

5. A method according to claim 2, further comprising rotating an image for each circulation by 360°/the number of circulations.

6. A method according to claim 2, wherein said displacement detecting pattern has a circular pattern as centering pattern at central part, and a line-segment pattern arranged concentrically with said circular pattern around said circular pattern as a pattern for angle detection.

7. A method according to claim 4, further comprising rotating an image for each circulation by 360°/the number of circulations.

8. A method according to claim 4, wherein said displacement detecting pattern has a circular pattern as centering pattern at central part, and a line-segment pattern arranged concentrically with said circular pattern around said circular pattern as a pattern for angle detection.

* * * * *